US009309139B2

(12) United States Patent
Bookbinder et al.

(10) Patent No.: US 9,309,139 B2
(45) Date of Patent: Apr. 12, 2016

(54) HIGH VOLUME PRODUCTION OF DISPLAY QUALITY GLASS SHEETS HAVING LOW ZIRCONIA LEVELS

(71) Applicant: Corning Incorporated, Corning, NY (US)

(72) Inventors: Andrea Weiss Bookbinder, Corning, NY (US); Bryce Patrick Butler, Elmira, NY (US); Gilbert De Angelis, Lindley, NY (US); David Myron Lineman, Painted Post, NY (US); Guido Peters, Bath, NY (US)

(73) Assignee: Corning Incorporated, Corning, NY (US)

( * ) Notice: Subject to any disclaimer, the term of this patent is extended or adjusted under 35 U.S.C. 154(b) by 100 days.

(21) Appl. No.: 14/179,857

(22) Filed: Feb. 13, 2014

(65) Prior Publication Data

US 2014/0230491 A1     Aug. 21, 2014

Related U.S. Application Data

(60) Provisional application No. 61/765,093, filed on Feb. 15, 2013.

(51) Int. Cl.
| | | |
|---|---|---|
| *C03B 5/03* | (2006.01) | |
| *C03B 5/43* | (2006.01) | |
| *C03B 17/06* | (2006.01) | |

(Continued)

(52) U.S. Cl.
CPC . *C03B 5/225* (2013.01); *C03B 5/16* (2013.01); *C03B 5/1675* (2013.01); *C03B 5/185* (2013.01); *C03B 5/43* (2013.01); *C03B 5/027* (2013.01); *Y02P 40/57* (2015.11)

(58) Field of Classification Search
CPC .............. C03B 5/42–5/43; C03B 5/027–5/031
See application file for complete search history.

(56) References Cited

U.S. PATENT DOCUMENTS

| | | | |
|---|---|---|---|
| 4,693,740 A | * | 9/1987 | Noiret ..................... C03B 5/027 65/135.1 |
| 4,819,247 A | | 4/1989 | Seng et al. ...................... 373/30 |

(Continued)

FOREIGN PATENT DOCUMENTS

JP          2010-168279          8/2010

OTHER PUBLICATIONS

PCT Application No. PCT/US2014/016216, filed Feb. 13, 2014, PCT Search Report.

(Continued)

*Primary Examiner* — Erin Snelting
(74) *Attorney, Agent, or Firm* — Thomas R. Beall; Ryan T. Hardee

(57) ABSTRACT

Methods and apparatus for producing display quality glass sheets are provided in which the batch materials for making the sheets are melted in a furnace whose glass-engaging surfaces comprise zirconia ($ZrO_2$). By using molybdenum electrodes, instead of the conventional tin electrodes, to electrically heat the molten glass, the wear rate per unit area of the furnace's glass-engaging, zirconia-containing surfaces are reduced by more than 50%, thus reducing zirconia levels (solid+dissolved) in the finished glass by at least a similar amount. As a consequence of this reduction, rejection rates of finished glass sheets are lowered, which is of particular value in the production of glass sheets of large dimensions, as desired by display manufacturers and other users of such sheets.

20 Claims, 10 Drawing Sheets

(51) Int. Cl.
*C03B 5/225* (2006.01)
*C03B 5/16* (2006.01)
*C03B 5/167* (2006.01)
*C03B 5/185* (2006.01)
*C03B 5/027* (2006.01)

(56) References Cited

U.S. PATENT DOCUMENTS

| | | | |
|---|---|---|---|
| 5,151,918 A * | 9/1992 | Argent | C03B 5/43 373/27 |
| 5,342,426 A | 8/1994 | Dumbaugh, Jr. | 65/23 |
| 5,374,595 A | 12/1994 | Dumbaugh et al. | 501/66 |
| 5,785,726 A | 7/1998 | Dorfeld et al. | 65/134.1 |
| 6,319,867 B1 | 11/2001 | Chacon et al. | 501/66 |
| RE37,920 E | 12/2002 | Moffatt et al. | 501/69 |
| 7,032,412 B2 | 4/2006 | Dorfeld et al. | 65/53 |
| 7,534,734 B2 | 5/2009 | Ellison | 501/66 |
| 7,628,038 B2 | 12/2009 | DeAngelis et al. | 65/134.1 |
| 7,628,039 B2 | 12/2009 | DeAngelis et al. | 65/157 |
| RE41,127 E | 2/2010 | Kohli | 428/428 |
| 7,833,919 B2 | 11/2010 | Danielson et al. | 501/66 |
| 7,851,394 B2 | 12/2010 | Ellison | 501/66 |
| 8,158,543 B2 | 4/2012 | Dejneka et al. | 501/68 |
| 2006/0137402 A1 * | 6/2006 | Eichholz | C03B 5/027 65/347 |
| 2011/0045961 A1 | 2/2011 | Dejneka et al. | 501/66 |
| 2011/0120191 A1 | 5/2011 | DeLamielleure et al. | 65/29.21 |
| 2011/0201490 A1 | 8/2011 | Barefoot et al. | 501/66 |
| 2012/0216566 A1 | 8/2012 | Ishino et al. | 65/29.12 |

OTHER PUBLICATIONS

R.D. Argent, "Modern Trends in Electrode Utilization", IEEE Transactions on Industry Applications, Jan./Feb. 1990, vol. 26, No. 175,180, pp. 1102-1110.

* cited by examiner

HIGH VOLUME PRODUCTION OF DISPLAY QUALITY GLASS SHEETS HAVING LOW ZIRCONIA LEVELS

CROSS-REFERENCE TO RELATED APPLICATIONS

This application claims the benefit of priority under 35 U.S.C. §119 of U.S. Provisional Application Ser. No. 61/765,093 filed on Feb. 15, 2013, the entire content of which is hereby incorporated by reference.

FIELD

This disclosure relates to methods and apparatus for producing display quality glass sheets. The sheets can be used as substrates in the manufacture of displays, e.g., liquid crystal displays (LCDs), organic light emitting diode displays (OLEDs), plasma displays, etc., as well as in the manufacture of photovoltaic devices. Another important application for the glass sheets is in the manufacture of faceplates and/or touch surfaces for electronic devices, e.g., portable electronic devices and large scale interactive screens.

In accordance with the disclosure, the batch materials for making display quality glass sheets are melted in a furnace (melter) whose glass-engaging surfaces comprise zirconia ($ZrO_2$), e.g., a furnace whose glass-engaging surfaces comprise electrocast zirconia. As discussed fully below, by using molybdenum electrodes, instead of the conventional tin electrodes, to electrically heat the molten glass, the wear rate per unit area (referred to herein as the "specific wear rate") of the furnace's glass-engaging, zirconia-containing surfaces is reduced by more than 50%, thus reducing zirconia levels (solid+dissolved) in the finished glass by at least a similar amount. As a consequence of this reduction, rejection rates of finished glass sheets are lowered, which is of particular value in the production of glass sheets of large dimensions, as desired by display manufacturers and other users of such sheets.

DEFINITIONS

As used herein, the total wear rate (TWR) of the zirconia-containing, glass-contacting surfaces of a melting furnace is defined as:

$$TWR = ([ZrO_2]*\rho/100 + N*W)*(FR/\rho) \tag{1}$$

where for a population of 50 sequential glass sheets produced using the melting furnace, $[ZrO_2]$ is the average zirconia concentration of the glass making up the sheets in weight percent, $\rho$ is density of the glass in grams/cm$^3$, N is the average number of zirconia-containing solid defects having a size greater than 100 microns per cm$^3$ of the glass, W is the average weight in grams of the zirconia-containing solid defects having a size greater than 100 microns, and FR is the average flow rate of molten glass leaving the melting furnace in grams/hour. As can be seen from this equation, the units of TWR are grams/hour.

As used herein, the specific wear rate (SWR) of the zirconia-containing, glass-contacting surfaces of a melting furnace, i.e., the wear rate per unit area, is defined as:

$$SWR = TWR/A_{surface} \tag{2}$$

where $A_{surface}$ is the area in cm$^2$ of zirconia-containing refractory that comes into contact with molten glass in the melting furnace. As can be seen from this equation, the units of SWR are grams/hour-cm$^2$.

As used herein, a zirconia-containing solid defect is a solid defect that contains zirconium and oxygen as zirconia ($ZrO_2$), zircon ($ZrSiO_4$), or in other forms.

As used herein, a display quality glass sheet is a glass sheet having a thickness of at most 2 millimeters, a volume of at least $3 \times 10^3$ cubic centimeters, and optical properties suitable for display applications or similar applications in which light transmission is of importance, e.g., photovoltaic applications. In terms of the defect levels discussed and claimed herein, a glass sheet is a sheet as removed from a glass ribbon prior to any finishing or division of the sheet into sub-pieces. For this purpose, a glass sheet does not include portions of a sheet that are removed when beads formed at the edges of the ribbon during, for example, the fusion process, are removed.

BACKGROUND

I. Display Quality Glass Sheets

Historically, display quality glass sheets have been commercially produced using the float process or the fusion overflow downdraw process (fusion process). In each case, the process involves four basic steps: melting batch materials, fining (refining) the molten glass to remove gaseous inclusions, conditioning the refined glass to prepare it for forming, and forming, which in the case of the float process involves the use of a molten tin bath, while for the fusion process, involves the use of a forming structure, e.g., a zircon isopipe. In each case, the forming step produces a ribbon of glass which is separated into individual glass sheets. The sheets are inspected and those that meet the customer's requirements are finished and delivered. The sheets that fail to pass inspection are normally crushed into cullet and remelted with new raw materials.

The goal for both the float and fusion processes is to produce glass sheets having low levels of defects, i.e., low levels of gaseous and solid defects. More particularly, the goal is to achieve a low level of defects for the glass sheets as manufactured so as to reduce the number of sheets that are rejected by the inspection process. The economics of the process and thus the cost of the glass sheets are highly dependent on the reject level.

Gaseous defects are introduced into the molten glass during the melting process, as well as downstream through such mechanisms as hydrogen permeation (see Dorfeld et al., U.S. Pat. No. 5,785,726). Solid defects can originate from the batch materials, as well as from the refractories and/or heat-resistant metals that come into contact with the molten glass as it moves through the process. Wear of the glass-engaging surfaces of the furnace used to melt the batch materials is one of the primary sources of solid defects. A common material for the walls of a melting furnace is zirconia, e.g., electrocast zirconia, and thus the formation of zirconia-containing solid defects has been and continues to be a challenging problem in the manufacture of display quality glass sheets.

As the demand for products employing display quality glass sheets has increased, manufacturers of such products have sought glass sheets of ever larger dimensions in order to achieve economies of scale. For example, the current sheets supplied to manufacturers of flat panel displays are known as Gen 10 sheets and have dimensions of 3200 mm×3000 mm×0.7 mm. From the point of view of glass manufacturers, the production of larger display quality glass sheets means that more glass has to be moved through the manufacturing process per unit time. However, this increase in production rate cannot be achieved through compromises in the quality of the sheets supplied to the customer. Indeed, as the resolution of display products has and continues to increase, the quality of the glass sheets used in such products has and must continue to improve. In terms of rejects, larger sheets make reducing the levels of solid and gaseous defects even more important because each rejected sheet represents more glass that was produced but not supplied to a customer. The higher quality standards demanded by customers only exacerbates this problem.

One of the key limiting steps in the production of high quality glass sheets is glass melting and the subsequent fining (refining) of the molten glass to remove gaseous inclusions. In the past, melting has been accomplished through a combination of burning fossil fuels (e.g., methane) and direct electrical heating (Joule heating). The Joule heating has been performed using tin oxide electrodes. These electrodes have set an upper limit on the production rate of display quality glass sheets. In particular, as illustrated in FIGS. 6-8 and discussed below, for melters whose glass-engaging surfaces are composed of zirconia, it has been found that the rate of wear of the walls of the melter increases substantially as the current through the tin oxide electrodes is increased to accommodate higher production rates. This increased wear translates into increased concentrations of dissolved zirconia and increased levels of zirconia-containing solid defects in the finished glass sheets. In addition to the wear problem, when electricity passes through tin oxide electrodes it generates bubbles at the interface between the electrode and the molten glass. These bubbles represent an additional load on the finer (refiner) used to clarify the molten glass.

In the glass industry, melting effectiveness is often reported in units of square feet/ton/day, where the square feet is the footprint of the melter and the tons/day is the flow rate through the melter. For any designated pull rate (flow rate), the smaller the square feet/ton/day number the better since it means that less square footage will be required in a manufacturing plant to achieve the desired output. For ease of reference, melting effectiveness defined in this way will be referred to herein as the furnace's "$Q_R$-value" given by the formula:

$$Q_R = A_{furnace}/R \quad (3)$$

where $A_{furnace}$ is the horizontal cross-sectional area of the molten glass in the melting furnace in square feet and R is the rate at which molten glass leaves the furnace and enters the finer in tons of glass per day.

As a consequence of the limitations imposed by tin oxide electrodes, in practice, the maximum flow rates and associated $Q_R$-values for commercial melters using such electrodes to melt display quality glasses have been 1,900 pounds/hour at a $Q_R$-value in the range of 6-7 square feet/ton/day. Above this flow rate, defect levels rise rapidly to unacceptable levels. Although such a flow rate and associated $Q_R$-value is adequate for many applications, melters that are capable of operating at higher flow rates, e.g., at flow rates above 2,000 pounds/hour, without substantial increases in $Q_R$-values are desirable to enable the industry to meet the ever growing demand for large, display quality, glass sheets. Achieving such higher flow rates with $Q_R$-values below 6.0 square feet/ton/day is even more desirable.

II. Melting Furnaces Employing Zirconia-Containing Glass-Engaging Surfaces

Japanese Patent Publication No. P2010-168279A, which is entitled "Method for Manufacturing Alkali-Free Glass" and is assigned to the Nippon Electric Glass Co., Ltd. (hereinafter the '279 application), discusses the problem of elution of zirconia from melting furnaces whose walls are made of zirconia refractories. As described in paragraph [0022] of this reference, "it was discovered that when an alkali-free [display] glass . . . is melted with manufacturing equipment that uses high zirconia-based refractories, a $ZrO_2$ component elutes from the refractories and the $ZrO_2$ concentration in the glass intensifies, and devitrification occurs very easily . . . ."

The '279 application seeks to address this problem by constructing the "supply passage" of its glass making system out of platinum or a platinum alloy, where in the terminology of the '279 application, "the 'supply passage' means all of the equipment provided between the furnace and the molding device." ('279 application at paragraph [0061].) As explained in the '279 application, "the greater the portion [of the supply passage] formed with platinum or platinum alloy, the better, and ideally the entire surface that is in contact with the glass is formed of platinum or platinum alloy."

Importantly, the '279 application contains no recognition of the discovery of the present application that by using molybdenum electrodes instead of the tin oxide electrodes normally used in the melting of display quality glasses, the specific wear rate of a melting furnaces glass-engaging surfaces composed of zirconia can be reduced by more than 50%. Rather, the '279 application treats tin oxide, molybdenum, and platinum electrodes as fungible and in selecting an electrode, considers only electrode wear and contamination of the glass by the elution of the electrode material, not the effects of the choice of electrode on the wear rate of the walls of a furnace made from a zirconium-containing material. See paragraph [0060] of the '279 application ("There is no particular restriction to the electrode material; the material can be selected appropriately by considering the life of the electrode, the degree of corrosion, and the like.").

Moreover, in its Application Examples, the '279 application uses tin oxide electrodes. See paragraph [0090] of the '279 application ("direct electrical heating by means of an $SnO_2$ electrode was performed"). In using tin oxide electrodes, the '279 application is following the conventional wisdom that for highest quality glasses, such as the borosilicate glasses used for display applications, tin oxide electrodes should be used. See Argent, R. D., "Modern Trends in Electrode Utilization," IEEE Transactions on Industry Applications, January/February 1990, 26:175, 180 ("[B]orosilicate-type glasses are among a group of glasses that demand the highest quality requirements. Seed and blister are usually not tolerated, and as such, the tin oxide electrode has become commonplace when manufacturing these glasses.")

In its Application Example 2, the '279 application achieves a $ZrO_2$ concentration in its finished glass of 0.2 weight percent. See Table 3 of the '279 application. This concentration is substantially higher than the concentrations achieved using the technology of the present disclosure. In particular, zirconia concentrations in the finished glass that are at least 50% lower, i.e., levels less than or equal to 0.1 weight percent, e.g., levels less than or equal to 0.05 weight percent, are readily achieved using the present technology.

U.S. Patent Application Publication No. US 2011/0120191, which is entitled "Fusion Processes for Producing Sheet Glass" and is assigned to Corning Incorporated (hereinafter the '191 application), also relates to the problem of zirconia eluting from melting furnaces made from zirconia-containing refractories. The approach of the '191 application is to control the temperature distribution of the glass making system so that zirconia that has entered the glass does not crystallize out of solution and form zirconia-containing solid defects. As with the '279 application, the '191 application does not address the source of the zirconia in the molten glass, i.e., the wear rate of the zirconia furnaces glass-engaging surfaces when melting display quality glasses, and thus does not provide a method or apparatus for reducing the level of zirconia-containing solid defects in display glasses.

A low wear rate and thus a low concentration of zirconia and a low level of zirconia-containing solid defects in the finished glass is just one criterion for a successful melting furnace for display quality glass sheets. Other criteria include the ability to achieve high flow rates, ease of fining, compatibility with the agents used to fine (refine) "green" glasses (i.e., glasses that do not contain arsenic or antimony), and low levels of contamination of the display quality glass by the electrode material. As demonstrated below, in addition to reducing zirconia concentrations and defect levels, the melting furnaces disclosed herein satisfy these and other criteria for an effective melting furnace for display glasses.

SUMMARY

In accordance with the present disclosure, methods for making display quality glass sheets are provided that include the following steps:
(I) melting batch materials (14) in a furnace (12) to produce molten glass (15);
(II) fining the melted batch materials in a finer (16);
(III) forming a glass ribbon (31) from the fined, molten glass; and
(IV) separating glass sheets (32) from the ribbon (31);
wherein:
(a) the furnace (12) has an internal surface, a portion (33, 34) of which contacts molten glass;
(b) said portion (33,34) of the internal surface that contacts molten glass comprises $ZrO_2$ as its major constituent;
(c) the melting of step (I) comprises employing a plurality of electrodes (13) to pass electrical current through the molten glass;
(d) each of the plurality of electrodes (13) comprises molybdenum as its major constituent;
(e) molten glass leaves the furnace (12) and enters the finer (16) at a rate R, where at steady state, R satisfies the relationship:

$R \geq 2{,}000$ pounds/hour; and (f) at steady state, the glass sheets (32) produced in step (IV) are characterized by:
(i) the glass making up the glass sheets is an aluminasilicate glass;
(ii) the average content of $ZrO_2$ in the glass sheets satisfies the relationship:

$[ZrO_2] \leq 0.1$, where $[ZrO_2]$ is in weight percent on an oxide basis;
(iii) the average content of $MoO_3$ in the glass sheets satisfies the relationship:

$0 < [MoO_3] \leq 0.002$, where $[MoO_3]$ is in weight percent on an oxide basis; and
(iv) prior to removal of any unacceptable glass sheets, a population of 50 sequential sheets has an average level of solid defects plus gaseous defects of a size greater than 100 microns that is less than or equal to 0.012 defects per pound of glass (e.g., preferably, less than or equal to 0.009 defects per pound of glass, more preferably, less than or equal to 0.006 defects per pound of glass), where each of the glass sheets (32) has a thickness that is less than or equal to 2.0 millimeters and a weight of at least 10 pounds.

In an embodiment, the methods are characterized by:
(i) the melting of step (I) produces a volume of molten glass (15) in the furnace (12) that has a horizontal cross-sectional area $A_{furnace}$;
(ii) at steady state, the sheets (32) are separated from the ribbon (31) in step (IV) at a rate such that the quotient $Q_R$ obtained by dividing $A_{furnace}$ in square feet by R in tons of glass/day satisfies the relationship:

$6 \leq Q_R \leq 7$.

In an embodiment, the methods are characterized by $Q_R$ satisfying the relationship:

$Q_R < 6$.

In an embodiment, the average content of $ZrO_2$ in the glass sheets satisfies the relationship:

$[ZrO_2] \leq 0.05$, where $[ZrO_2]$ is in weight percent on an oxide basis.

In an embodiment, the methods are practiced using the fusion overflow downdraw process.

Apparatus for practicing the above methods is also disclosed.

The reference numbers used in the above summary of the invention are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that the various features of the invention disclosed in this specification and in the drawings can be used in any and all combinations.

DETAILED DESCRIPTION

As discussed above, the present disclosure relates to the use of a melting furnace which has zirconia-containing walls and employs molybdenum electrodes to produce display quality glass sheets. As a result of this combination, the sheets as manufactured (i.e., as cut from the glass ribbon and prior to selection for unacceptable sheets) have low levels of dissolved zirconia and low average levels of zirconia-containing solid defects.

The transformation from molten glass to glass sheets can be performed using a variety of techniques now known or subsequently developed. As noted above, display-quality glass sheets are currently being produced commercially by the float and fusion processes, with fusion generally being more common To simplify the presentation, the furnace of the present disclosure will be discussed in terms of a fusion process, it being understood that the furnace can also be used with float and other processes if desired.

It should be noted that irrespective of the particular process used, the molten glass produced by the furnace will pass through a finer (also known as a refiner) in which gaseous inclusions (bubbles) are removed. Finers of various types, including vacuum finers, can be used as desired. In some cases, a single enclosure can house the furnace and the finer, with the two portions separated by, for example, an internal wall or a portion of a wall. In such a case, both the furnace and the finer can have internal surfaces that (1) contact molten glass and (2) comprise $ZrO_2$ as its major constituent. Like the furnace, the finer can include a plurality of electrodes that comprise molybdenum as its major constituent. In other cases, a conduit-shaped vessel can carry the molten glass from the furnace to the finer.

Figure 1:
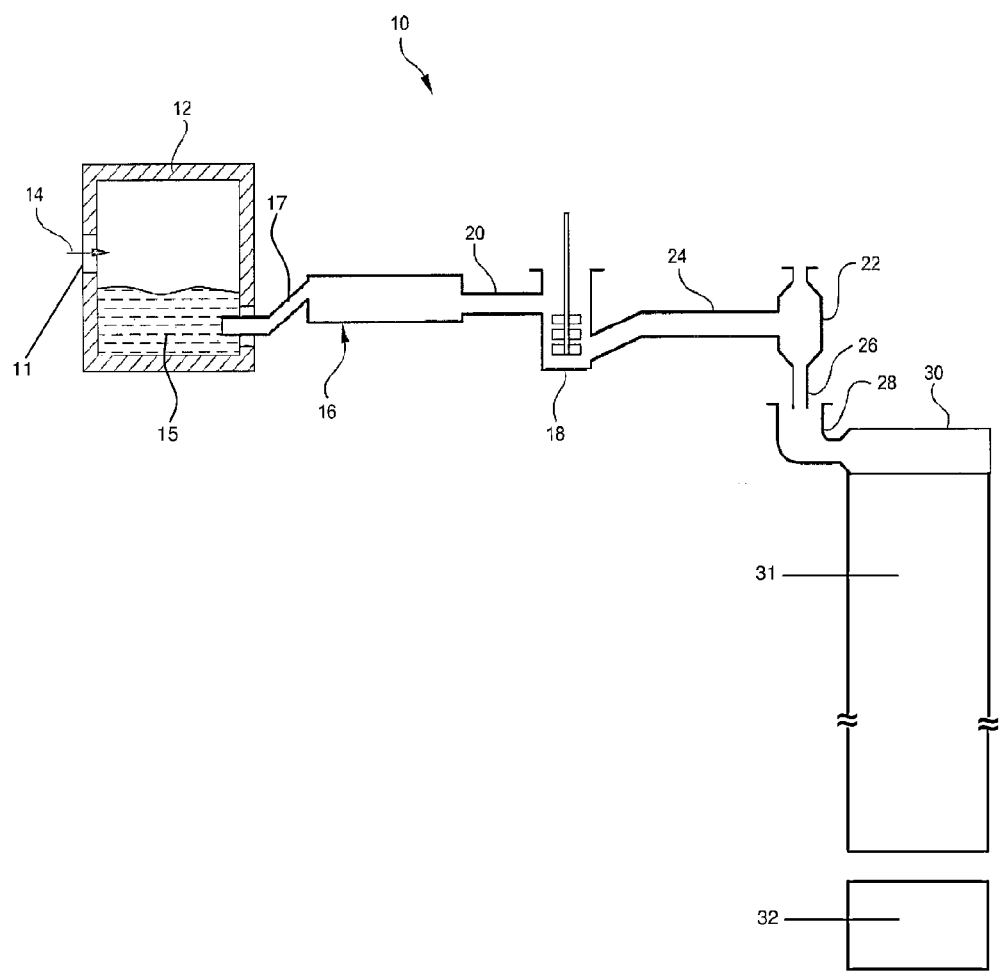
FIG. 1 is a schematic diagram of a system for producing display quality glass sheets which employs the fusion overflow downdraw process.

FIG. 1 shows the major components of an exemplary glass manufacturing system 10 employing the fusion process to make display quality glass sheets. The system includes a furnace 12 constructed in accordance with the present disclosure into which batch materials 14 are introduced using port 11 and then melted to form molten glass 15.

The batch materials may be introduced into the furnace using either a batch-by-batch process, wherein the glass forming constituents are mixed together and introduced into the furnace as a discrete load, or a continuous process in which the batch materials are mixed and introduced into the furnace substantially continuously. The batch materials may, and typically will, include cullet. The batch materials may be introduced into the furnace through port 11 by means of a push bar, in the case of a batch-by-batch process, or a screw or auger apparatus, in the case of a continuous feed furnace. The amounts and types of batch material constituents make up the glass "recipe" for the particular type of glass sheets that are to be produced.

In addition to furnace 12, the glass manufacturing system 10 of FIG. 1 further includes components that are typically made from platinum or platinum-containing metals such as platinum-rhodium, platinum-iridium and combinations thereof, but which may also comprise such refractory metals as palladium, rhenium, tantalum, titanium, tungsten, molybdenum, or alloys thereof. The platinum-containing components can, for example, include: fining vessel 16 (e.g. finer tube 16); a furnace-to-finer, conduit-shaped vessel 17 (e.g., connecting tube 17); a mixing vessel 18 (e.g. stir chamber 18); a finer-to-stir chamber, conduit-shaped vessel 20 (e.g., connecting tube 20); a delivery vessel 22 (e.g., bowl 22); a stir chamber-to-bowl, conduit-shaped vessel 24 (e.g., connecting tube 24); a downcomer 26; and an inlet 28. Inlet 28 is coupled to forming vessel 30 (e.g., fusion pipe 30) which forms glass ribbon 31 from which individual glass sheets 32 are separated using, for example, a traveling anvil machine (TAM; not shown in FIG. 1). Forming vessel 30 is made from a refractory material such as zircon and is sometimes referred to as an "isopipe".

As disclosed in Dorfeld et al. U.S. Pat. No. 5,785,726, platinum-containing metals have the property that at high temperatures, they are more permeable to hydrogen than to oxygen. As a result, oxygen-containing bubbles can form at the interface between molten glass and the inside surface of a vessel whose walls are composed of a platinum-containing metals. The above Dorfeld patent describes techniques for controlling this "hydrogen permeation" mechanism for generating gaseous defects by controlling the partial pressure of hydrogen in the atmosphere surrounding the vessel. DeAngelis et al. U.S. Pat. Nos. 7,628,038 and 7,628,039 describe particular applications of the principles disclosed in the Dorfeld patent wherein a capsule is used to surround all or a part of one or more vessels having platinum-containing walls with an atmosphere having a specified elevated hydrogen concentration. Dorfeld et al. U.S. Pat. No. 7,032,412 describes an alternate approach for dealing with the hydrogen permeation problem in which a barrier coating is applied to all or a part of the outside surface of the platinum-containing walls of a vessel. One or more of these techniques can be used in the practice of the present disclosure to reduce the level of gaseous defects in the display quality glass sheets. The capsule approach of the above DeAngelis et al. patents has been found especially effective in this regard. The foregoing patents are hereby incorporated herein by reference in their entireties.

Control of the hydrogen permeation mechanism is especially important when "green" glasses are to be produced. Specifically, through the use of techniques of the type described above, glass sheets having low levels of gaseous defects can be produced without the use of arsenic or antimony as fining agents. The batch materials will then be free of purposely added arsenic and purposely added antimony, and the resulting glass sheets will have average arsenic levels of at most 500 ppm and average antimony levels of at most 500 ppm.

Figure 2:
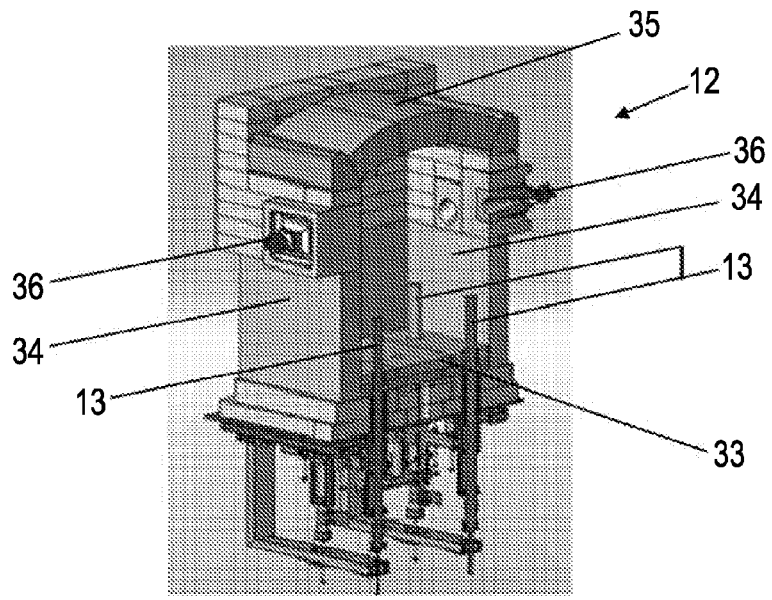
FIG. 2 is a schematic perspective drawing, partially in section, of an exemplary embodiment of a melting furnace constructed in accordance with the present disclosure.
Figure 3:
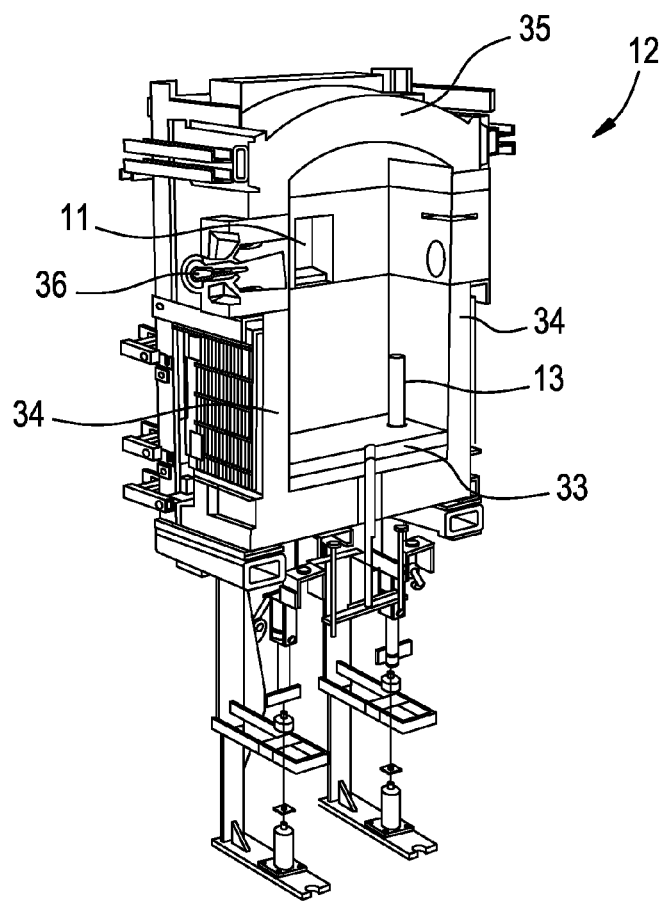
FIG. 3 is a schematic perspective drawing, partially in section, of the melting furnace of FIG. 2 from a different perspective.
Figure 4:
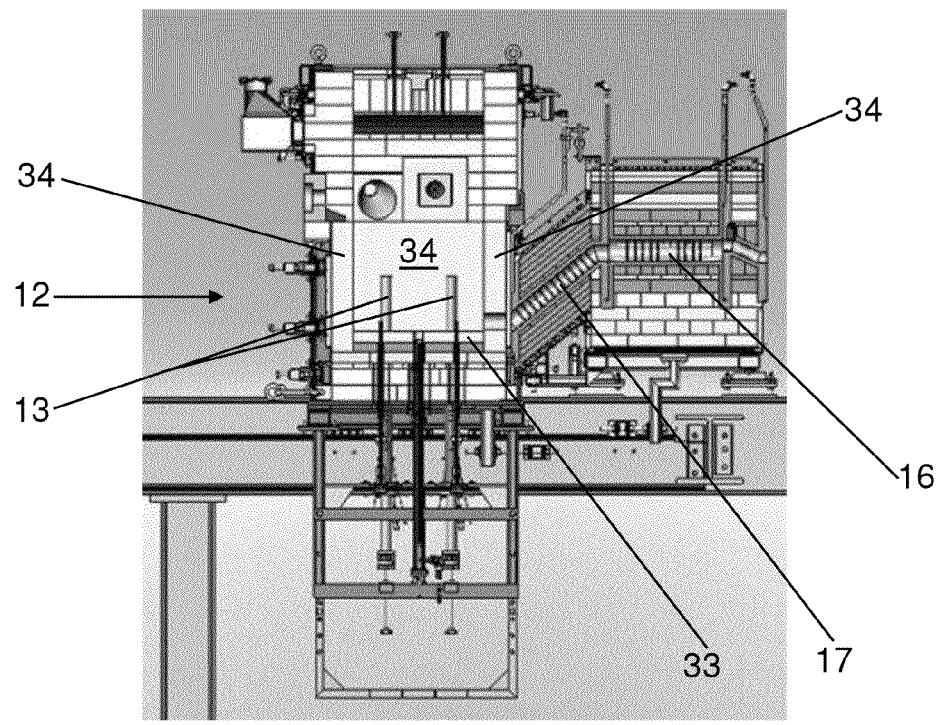
FIG. 4 is a schematic cross-sectional drawing of the melting furnace of FIGS. 2-3, showing connection of the furnace to a finer.

FIGS. 2 and 3 are perspective cross-sectional schematics of an embodiment of the furnace of the present disclosure, while FIG. 4 shows the furnace connected to fining vessel 16 by a connecting tube 17. As can be seen in these figures, the furnace has a bottom wall 33 and side walls 34 with the molybdenum electrodes 13 passing through the bottom wall and being spaced from the side walls. The furnace also includes a crown 35, which as shown in these figures is curved but may be flat if desired, and burners 36, which may, for example, be gas-oxygen burners. In order to minimize heat loss, in accordance with conventional practice, the walls of the furnace are surrounded by layers of insulating materials, only some of which are shown in FIGS. 1-4.

In accordance with this disclosure, the portion of the internal surface of the furnace which contacts molten glass is composed of zirconia ($ZrO_2$). Typically, the $ZrO_2$ content of the surface will be at least 90 wt. %. A variety of zirconia-containing materials can be used in the practice of this disclosure, examples of which include the SCIMOS Z, SCIMOS CZ, and SCIMOS UZ zirconia refractories sold by Saint-Gobain™ K.K., Tokyo, Japan. Comparable products are available from other manufacturers. In general terms, these materials comprise zirconia and/or cubic zirconia and a small amount (less than 10 wt. %) of a glass phase which, among other things, can increase the resistivity of the base material. Zirconia-containing materials of these types have been found to be compatible with the glass compositions used to make display quality glass sheets. In addition, these materials have low thermal conductivities, high electrical resistivities, and high dielectric constants, the latter two properties making the materials particularly well-suited for use in glass-making furnaces that employ electrical heating since they lead to greater energy transfer to the molten glass as opposed to the walls of the furnace.

Figure 5:
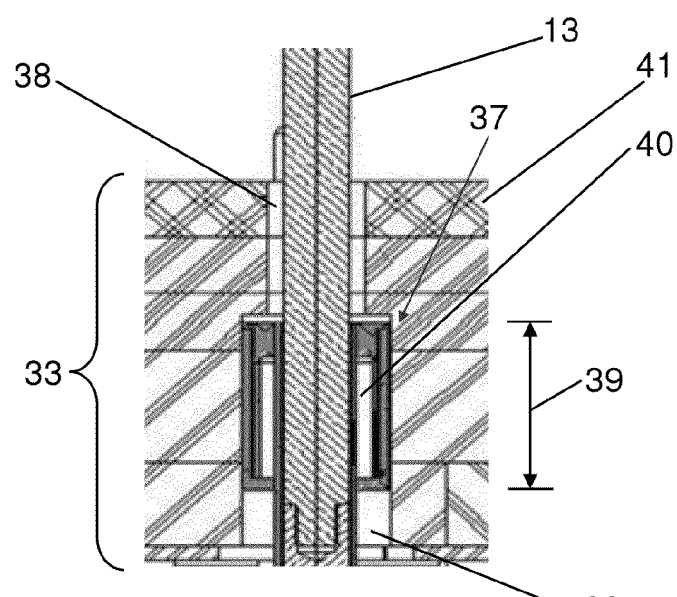
FIG. 5 is a schematic cross-sectional drawing showing a molybdenum electrode passing through the floor of the furnace of FIGS. 2-4.

In practice, because of cost considerations, only the glass-engaging, inner lining of the furnace is composed of a zirconia-containing material, with other, generally less expensive, refractory materials being used outboard of the zirconia-containing layer. This is illustrated in FIG. 5 where layer 41 is composed of fused zirconia, the remainder of the layers making up bottom wall 33 being composed of alumina and other types of refractory materials. Multiple zirconia-containing layers can, of course, be used in constructing the walls of the melting furnace if desired.

Molybdenum electrodes 13 will generally be cylindrically shaped, although other configurations can be used if desired. Also, the electrodes will generally be composed of a plurality of sections that are connected to one another by, for example, threaded joints. In this way, as an electrode wears, it can be pushed up from the bottom and a new section added at the bottom so as to permit long term use of the furnace without the need for a shutdown for electrode replacement. Elemental molybdenum will be the major constituent (i.e., >50%) of the molybdenum electrodes. Typically, the electrode will be essentially pure molybdenum, although in some cases, the electrode can include small amounts of other constituents, e.g., zirconia. Molybdenum electrodes are commercially available from a number of sources, including, for example, Plansee USA, of Franklin, Mass., and H.C. Starck Inc., of Newton, Mass.

In accordance with the present disclosure, it has been found that the wear rate of molybdenum electrodes is quite low when melting batch materials for display quality glass sheets, especially when compared to tin oxide electrodes. For example, a typical wear rate for tin oxide electrodes is ~$5 \times 10^{-4}$ pounds/pound of melted glass, while for molybdenum electrodes, it is less than ~$5 \times 10^{-6}$ pounds/pound of melted glass. This lower wear rate is an advantage of the furnaces of the present disclosure since it means that the furnaces can have a longer service life than furnaces employing tin oxide electrodes. The fact that new sections can be added to a molybdenum electrode without furnace shutdown (see above) is another reason why the furnaces of the present disclosure can have longer lives than furnaces employing tin oxide electrodes, where shutdown and draining of molten glass is required for electrode replacement.

As a result of wear of the molybdenum electrodes, the glass sheets produced from the molten glass will contain $MoO_3$. Quantitatively, in weight percent on an oxide basis, the concentration of $MoO_3$ in the glass sheets will satisfy the relationship: $0<[MoO_3]\leq0.002$. In an embodiment, the concentration of $MoO_3$ in the glass sheets in weight percent on an oxide basis may be even lower and may satisfy the relationship: $0<[MoO_3]\leq0.0005$.

At temperatures above 400° C., elemental molybdenum oxides to form $MoO_3$. Thus, portions of the electrode that are above this temperature and are not submerged in molten glass need to be protected from exposure to oxygen. In some cases, this can be achieved by changing the material of the electrode so that the submerged portion is molybdenum while the non-submerged portion is composed of a material that will not oxidize but still can conduct electricity to the submerged portion, e.g., the non-submerged portion can be $MoSi_2$ (see UK Patent Application GB 2 047 228).

In an embodiment, the protection is achieved by surrounding the non-submerged portion of the molybdenum electrode with an inert gas. Nitrogen can be used for this purpose and, in particular, nitrogen that has been treated to remove oxygen, e.g., nitrogen that has been treated with an inert gas purifier to reduce the oxygen content of the nitrogen to, for example, less than 1 ppm.

FIG. 5 illustrates exemplary apparatus for using an inert gas to provide protection for that portion of the molybdenum electrode that is not submerged in molten glass and is sufficiently hot so that oxidization is of concern (i.e., in FIG. 5, the portion of the electrode at the level of reference number 39). As shown in FIG. 5, bottom wall 33 includes a channel 38 through which molybdenum electrode 13 enters the furnace. Within this channel is an electrode holder 37 which contains an inner chamber 40 which is filled with the inert gas and surrounds the electrode in the region of reference number 39. In practice, the inert gas is flowed through chamber 40.

During use, the portion of channel 38 above holder 37 is filled with glass, specifically, solidified glass, where the solidification is achieved by surrounding the bottom portion of the electrode, i.e., the portion below chamber 40, with a water jacket (not shown in FIG. 5) through which a cooling fluid, e.g., water, circulates. The solidified glass, which can be on the order of a half an inch thick, helps electrically isolate the electrode from the surrounding refractories. In particular, it helps isolate the electrode from the zirconia-containing refractory. Such isolation reduces current flow and thus electrical heating of the zirconia-containing refractory. Although not wishing to be bound by any particular theory of operation, it is believed that the reduced zirconia concentrations and the reduced levels of zirconia-containing solid defects in glass sheets achieved by the melting furnaces of the present disclosure are, at least in part, a result of this electrical isolation.

Although the molybdenum electrodes of the embodiment illustrated in FIGS. 2-5 project into the molten glass through the furnace's bottom wall, other locations for the molybdenum electrodes can be used if desired. In particular, the electrodes can project into the molten glass through one or more of the side walls. Such side wall electrodes can be used alone or in combination with bottom wall electrodes. For most applications, the furnace will include at least some molybdenum electrodes that project through the bottom wall.

The embodiment of FIGS. 2-5 (and FIG. 9) is for a reduced-scale melter (experimental melter) and thus only four molybdenum electrodes were used. For full-scale, commercial melters, the number of molybdenum electrodes is increased so as to provide the necessary power to melt the raw materials without excessively high current densities at the individual electrodes. For example, a commercial melter can employ 10 or more (e.g., 12) pairs of molybdenum electrodes. In a representative embodiment, passage of current through the molybdenum electrodes will provide only part of the power needed to melt the batch materials provided to the furnace, the remainder of the power being provided by combustion of a fuel such as natural gas. Quantitatively, in an embodiment, the molybdenum electrodes will provide at least 30 percent of the overall power used to melt the batch materials.

Figure 6:
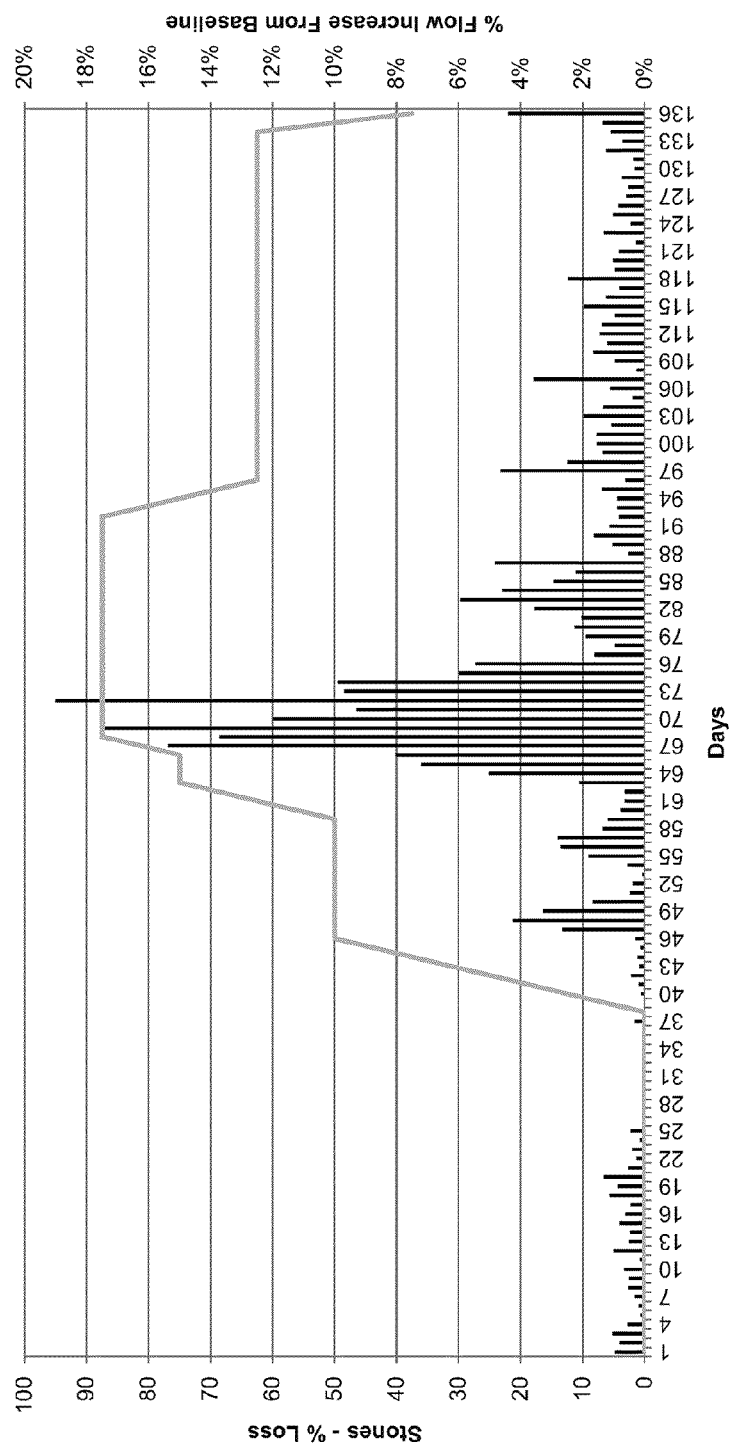
FIG. 6 is a graph illustrating the effect of flow rate on the level of $ZrO_2$ stones.
Figure 7:
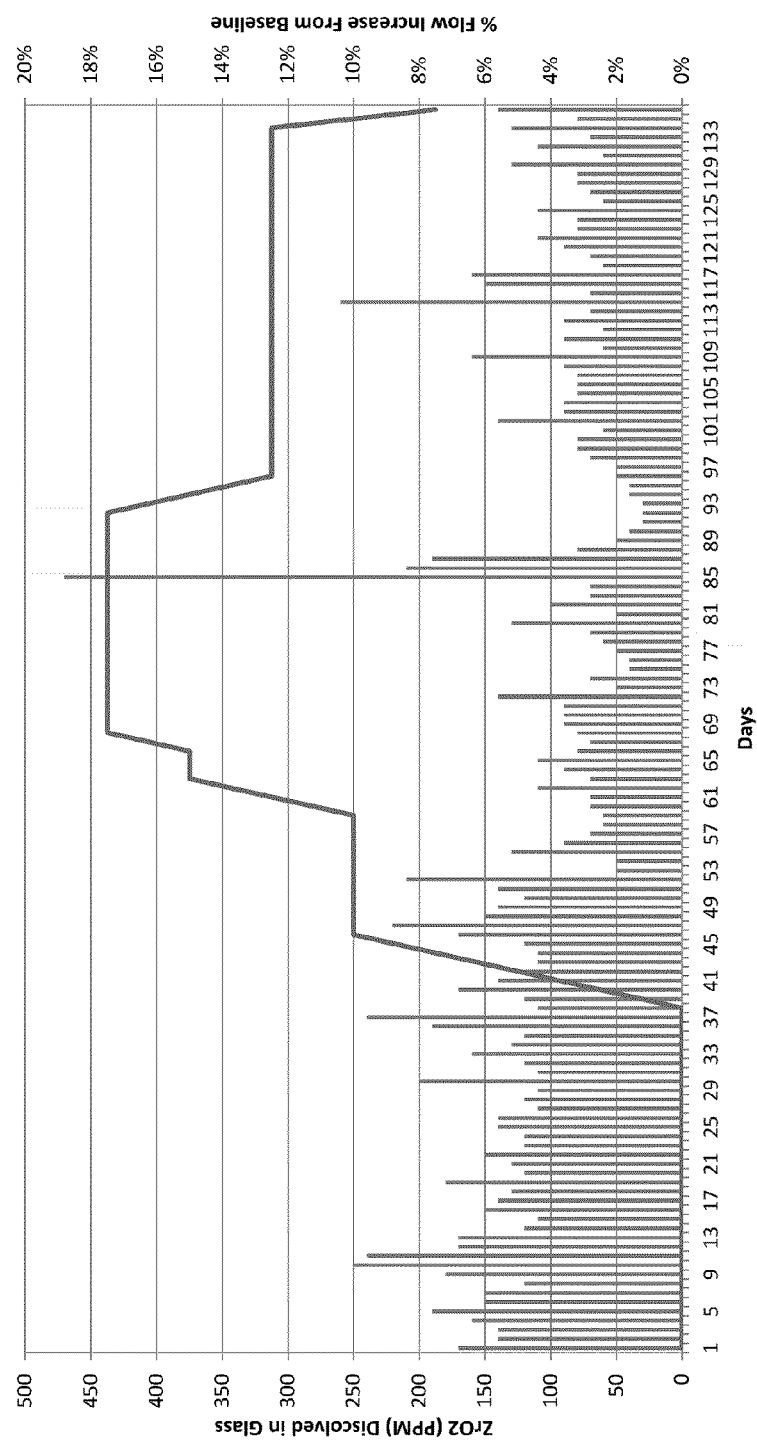
FIG. 7 is a graph illustrating the effect of flow rate on the level of dissolved $ZrO_2$.
Figure 8:
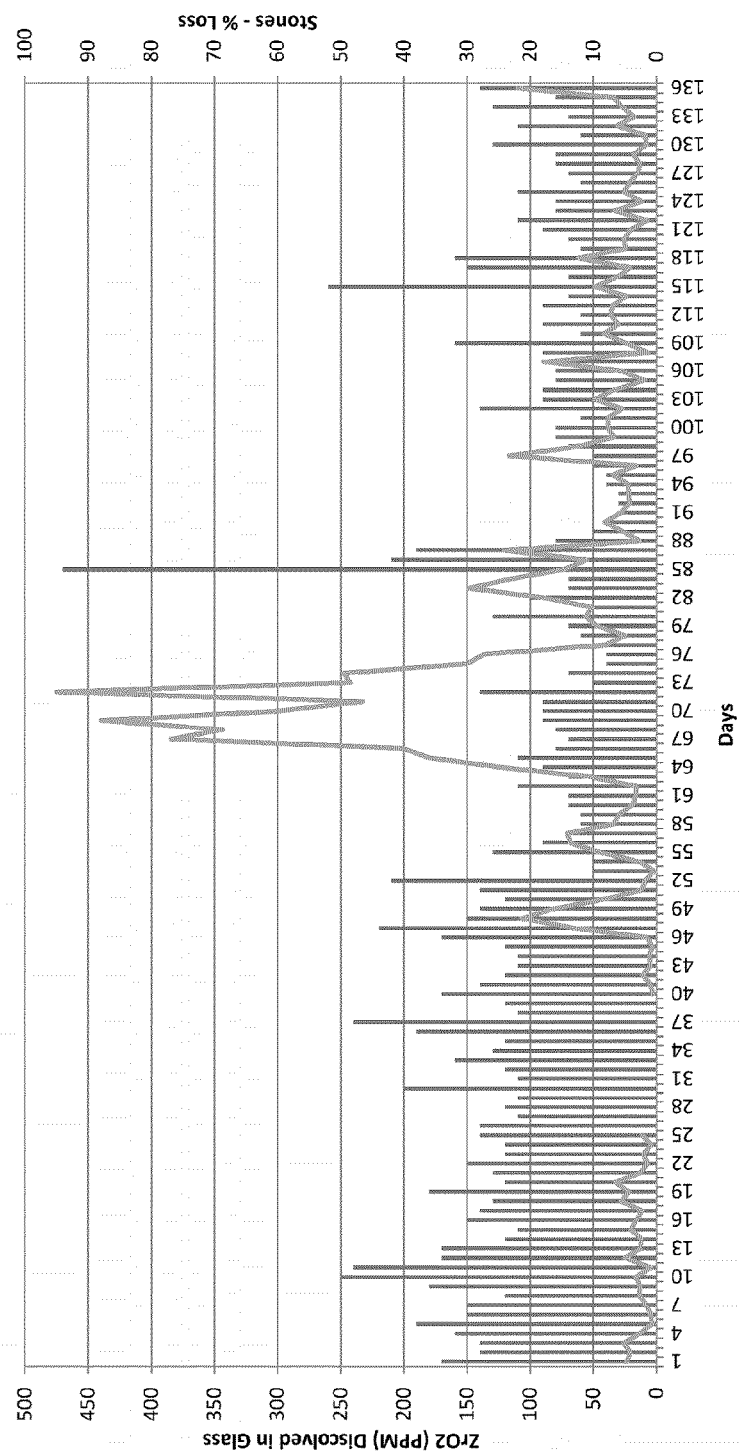
FIG. 8 is a graph which combines the $ZrO_2$ stone data of FIG. 6 with the dissolved $ZrO_2$ data of FIG. 7 in a single plot.

Although furnace walls composed of zirconia have been used with tin oxide electrodes, such use has resulted in furnaces with $Q_R$-values in the 6-7 square feet/ton/day range at the flow rates used in the commercial production of display quality glass sheets. Specifically, efforts to increase flow rates and reduce $Q_R$-values have been found to result in elevated dissolved zirconia concentrations and elevated levels of zirconia-containing solid defects in glass sheets produced using melting furnaces employing tin oxide electrodes. FIGS. 6-8 illustrate the problems that arise with increases in the flow rate of a melting furnace that has zirconia-containing walls and uses tin oxide electrodes for electrical heating of the molten glass.

The data shown in FIGS. 6-8 was obtained using a commercial melting unit for TFT-LCD glass having electrocast zirconia walls and six sets of tin oxide electrodes mounted in the side walls of the furnace. The glass being melted was Corning Incorporated's EAGLE XG® glass, which is a "green" glass that is fined with tin oxide and iron oxide, and without the use of arsenic or antimony. The design flow rate for the furnace was 1,900 pounds/hour. At this rate, the furnace produced glass sheets of standard commercial quality and had a $Q_R$-value of 6.2 square feet/ton/day.

The experiment of FIGS. 6-8 began by establishing a baseline at 2,000 pounds/hour. Thereafter, the glass flow rate was increased along with the amount of current introduced into the molten glass by the tin oxide electrodes. Measurements were made on finished glass sheets of (1) the concentration of zirconia and (2) the level of zirconia-containing solid defects (zirconia-based stones).

In FIGS. 6-8, zirconia concentrations are reported in parts-per-million (ppm), while the levels of zirconia-containing solid defects are reported as the percentage of rejected sheets (% loss). FIGS. 6 and 7 plot percent flow increase from baseline over the 136 days of the experiment as a solid curve, and stone level (% loss; FIG. 6) and dissolved zirconia (ppm; FIG. 7) as vertical bars. FIG. 8 plots the % loss data of FIG. 6 as a solid curve and the dissolved zirconia data of FIG. 7 as vertical bars.

As can be seen in these figures, the increase in glass flow rate resulted in a major increase in the level of zirconia-containing solid defects in the glass sheets, with the % loss of sheets rising on the order of ten fold (i.e., to above 90%) for less than a 20% increase in the flow rate. Efforts were made to reduce stone formation through process adjustments, and although some reduction was achieved, the level of losses remained 2-3 times higher than the baseline losses. Because losses at these levels compromise the competitiveness of the process, the data of FIG. 6 clearly demonstrate a fundamental problem with tin oxide electrodes, namely, their inability to operate at high flow rates without introducing high levels of zirconia-containing solid defects into the glass.

The effect of the increase in glass flow rate on the concentration of dissolved zirconia in the glass sheets was more complicated because of (1) a dilution effect and (2) the increase in the number of stones. As to the dilution effect, a higher flow rate means that the zirconia that leaves the walls of the furnace per unit time becomes distributed in a large volume of molten glass. For example, for a constant wear rate of the zirconia-containing walls of a furnace, the zirconia concentration in the glass sheets will go down as the flow rate increases because more glass leaves the melting furnace per unit time thus diluting the concentration of zirconia. Hence, an increase in dissolved zirconia may not be seen in the measured data even though the wear rate has increased.

An increase in the number of stones can also result in a decrease in dissolved zirconia concentration if the stones are produced by zirconia coming out of solution. On the other hand, stones that are generated directly from the zirconia-containing walls of the furnace can increase the zirconia concentration in the glass because they provide additional exposed surface area at which zirconia can dissolve into the glass melt. As can be seen in FIGS. 7 and 8, in this experiment, the dilution effect was dominant so that the net effect was a decrease in zirconia concentration.

Although a quantitative analysis was not performed, it is believed that in this experiment, the total wear rate and the specific wear rate of the zirconia-containing walls of the furnace increased as the flow rate increased. Specifically, as set forth in Eqs. (1) and (2) above, the total and specific wear rates include stone formation and as shown in FIG. 6, stone formation increased dramatically with flow rate. Also, the dilution effect does not affect these wear rates because both dissolved and solid zirconia in the glass sheets are multiplied by flow rate in obtaining the wear rate values.

To overcome problems of the type illustrated in FIGS. 6-8, experiments were performed using a melting furnace (i.e., the furnace illustrated in FIGS. 2-5 and 9) which had zirconium-containing walls, but used molybdenum electrodes rather than tin oxide electrodes. In particular, comparisons were made between a reduced-scale melting system employing molybdenum electrodes in accordance with the present disclosure (hereinafter, the "test" system) and a reduced-scale system employing tin oxide electrodes (hereinafter, the "control" system).

The control and test furnaces, as well as the finers to which they were attached, were not identical, in part because of changes needed to accommodate the molybdenum electrodes. For example, the control system employed a two zone melter having a primary furnace and a smaller secondary furnace, both of which employed tin oxide electrodes, while the test system employed a single zone melter having only a primary furnace, which employed molybdenum electrodes. However, the test and control systems were sufficiently similar to provide meaningful comparative data regarding the effects of the differences in the type of electrodes used. In each case, after leaving the finer, the molten glass was collected and cooled, so that defect counts (gaseous and solid) and chemical analyses, e.g., for dissolved zirconia content, could be performed.

Figure 9:
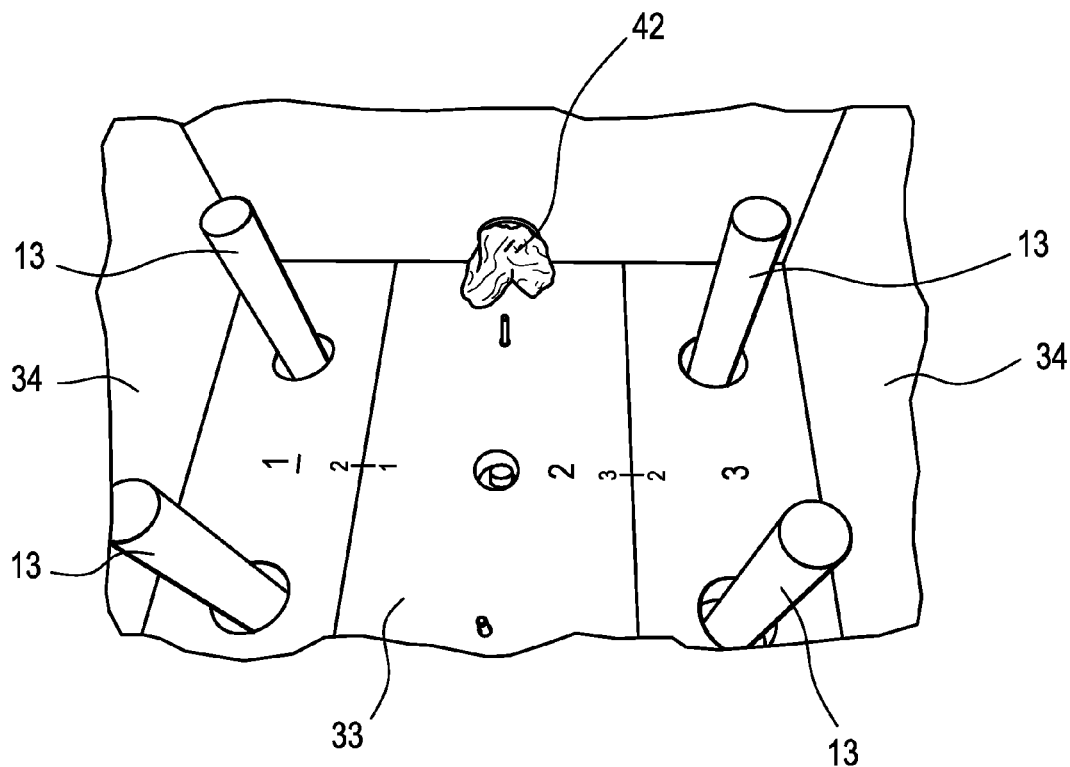
FIG. 9 is a photograph showing molybdenum electrodes extending through the floor of an exemplary embodiment of a melter constructed in accordance with the present disclosure.
Figure 10:
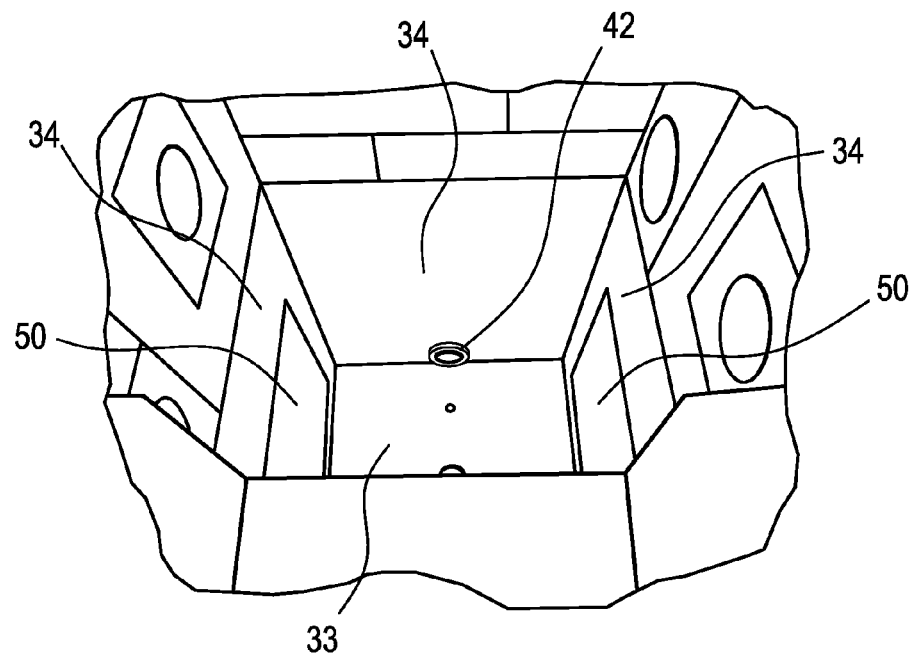
FIG. 10 is a photograph showing tin oxide electrodes mounted in the walls of a melter that was used for a comparative study with the melter of FIG. 9.

FIGS. 9 and 10 are photographs looking down into the primary furnaces of the two systems with the furnace crowns removed. FIG. 9 shows four molybdenum electrodes 13 extending through the bottom wall 33 of the test furnace, while FIG. 10 shows two tin oxide electrodes 50 supported by (embedded in) the side walls 34 of the control system's primary furnace. In each photograph, reference number 42 shows an exit port (closed with a cloth in FIG. 9 and a cover in FIG. 10) at the bottom of the furnace.

The spacing between the tin oxide electrodes of the control system's primary furnace (i.e., the FIG. 10 furnace) was 18 inches. Accordingly, the inside-edge-to-inside-edge spacing for each of the front and rear pairs of molybdenum electrodes was also set at 18 inches. Since the molybdenum electrodes had a diameter of 2 inches, this inside-edge-to-inside-edge spacing gave a center-to-center spacing of 20 inches. The front and rear pairs of molybdenum electrodes were separated by 12 inches (center-to-center), and the center-to-edge spacings to the side walls and to the back and front walls were 4 inches and 6 inches, respectively. Thus, the overall internal dimensions of the test furnace with the molybdenum electrodes was 28 inches wide by 24 inches deep, thus giving an $A_{furnace}$ value of 672 inches$^2$.

The primary furnace of the control system had a width of 18 inches and a depth of 19 inches, giving an $A_{furnace}$ value for the primary furnace of 342 inches$^2$. The secondary furnace of the control system had a width of 13 inches and a depth of 12 inches, giving an $A_{furnace}$ value for the secondary furnace of 156 inches$^2$. The overall $A_{furnace}$ value for the control system was thus 498 inches$^2$. During use, the molten glass depth in the primary and secondary furnaces of the control system was 16 inches and 12 inches, respectively, while for the test furnace it was 16 inches.

The glass used in the experiments comparing the test furnace and the control furnace, as well as in obtaining the other experimental results reported herein, was Corning Incorporated's EAGLE XG® glass, which is an example of the types of display quality glasses that can be melted with the furnaces disclosed herein. Other glasses which can be melted using the furnaces disclosed herein are discussed below. Commercial grade raw materials, i.e., sand, alumina, boric acid, calcium carbonate, magnesium oxide, strontium carbonate, strontium nitrate, and tin oxide as a fining agent, were supplied to the furnaces. Cullet obtained from the commercial production of EAGLE XG® glass was also included. Such cullet was produced using commercial furnaces employing tin oxide electrodes embedded in their walls, and thus included $ZrO_2$ from erosion of the walls. In the $ZrO_2$ comparisons between the test and control furnaces set forth below, this cullet contribution has been backed out. Although some zirconia-containing solid defects were seen for both the test and control furnaces, the levels in each case were not substantial and thus the following analysis is in terms of dissolved zirconia.

In a first experiment, X-ray analysis for dissolved $ZrO_2$ was performed on glass samples produced using the test and control furnaces. For the control system, the analysis showed a gross dissolved $ZrO_2$ content of 0.074 wt. %. However, 0.006 wt. % of this total was introduced by the cullet, thus giving a net value due to the melting system of 0.068 wt. %. For the test system, the corresponding values were 0.052 wt. % gross value and 0.004 wt. % from cullet, thus giving a net value of 0.048 wt. %. The difference in cullet contributions arises from the control system using cullet which happened to have a $ZrO_2$ content of 0.025 wt. %, while the test system used cullet with a lower $ZrO_2$ content, i.e., 0.019 wt. %.

As this data shows, the $ZrO_2$ erosion for the test system with molybdenum electrodes was 30% less than with the tin oxide electrodes. This is especially significant when it is considered that the furnace of the test system had more exposed $ZrO_2$ surface area than the control system. Thus, the total surface area (sides, front, back, and bottom) of the furnace of the test system was 2,336 inches$^2$, while that of the primary and secondary furnaces of the control system was 1,818 inches$^2$, where the area occupied by the tin oxide electrodes of the primary and secondary furnaces (i.e., 12×14 inches$^2$ for each of the electrodes of the primary furnace and 8×8 inches$^2$ for each of the electrodes of the secondary furnace) have been subtracted from the overall areas of the sides, fronts, backs, and bottoms of those furnaces.

Thus, the test system had over 25% more exposed $ZrO_2$ than the control system and yet achieved a 30% reduction in net dissolved $ZrO_2$ in the resulting glass. The ability of molybdenum electrodes to reduce $ZrO_2$ erosion is evident from this data.

A further analysis was performed in which specific wear rates (SWR values; see Eq. (2) above) were determined for the test and control furnaces. Because the $ZrO_2$ wear rate is a function of temperature, the dissolved zirconia data was transformed to a common temperature. Specifically, in a separate experiment employing tin oxide electrodes, it was determined that over the temperature range from 1540° C. to 1620° C., dissolved zirconia increases substantially linearly as a function of temperature. A linear fit to the data gave the equation:

$$ZrO_2(\text{wt. \%}) = 0.0004T - 0.5862 \qquad (4)$$

where T is temperature in ° C. and the $R^2$ value for the fit was 0.886 (n=3).

The dissolved zirconia data for the control furnace was obtained for temperatures of 1578° C., 1600° C., 1591° C., and 1597° C. for pull rates of 26 lb/hour, 40 lb/hour, 50 lb/hour, and 60 lb/hour, respectively, while the data for the test furnace was obtained for temperatures of 1636° C., 1633.5° C., 1634.5° C., and 1637° C. for pull rates of 40 lb/hour, 55 lb/hour, 70 lb/hour, and 90 lb/hour, respectively. Using Eq. (4), the dissolved zirconia data for the control furnace was transformed to the average temperature of the test furnace data, i.e., 1635° C. Because the test furnace data was clustered around 1635° C., the data for this case was used as measured.

The results of this comparison are shown in the following table where the glass pull rate is in pounds/hour:

Specific Wear Rate $ZrO_2$ (gm/hr-cm$^2$)

| Glass Pull Rate | Tin Oxide Electrodes | Molybdenum Electrodes |
| --- | --- | --- |
| 26 | $1.75 \times 10^{-3}$ | |
| 40 | $1.49 \times 10^{-3}$ | $5.61 \times 10^{-4}$ |
| 50 | $1.65 \times 10^{-3}$ | |
| 55 | | $6.22 \times 10^{-4}$ |
| 60 | $1.55 \times 10^{-3}$ | |
| 70 | | $1.09 \times 10^{-3}$ |
| 90 | | $8.29 \times 10^{-4}$ |

The average of this data for the tin oxide electrodes is 1.61±0.11 gm/hr-cm$^2$, while for the molybdenum electrodes, the average is 0.78±0.24 gm/hr-cm$^2$. Thus, by using molybdenum electrodes, more than a 50% reduction was achieved in the amount of zirconia eluted from the walls of the furnace. This represents an important improvement in terms of controlling defect levels in display quality glass sheets.

It should be noted that the reduction in zirconia elution was not achieved at the expense of other defects. Thus, at all of the tested pull rates, the test system using the molybdenum electrodes had low levels of gaseous inclusions (bubbles) and solid defects. For example, at the 90 pounds/hour rate, the number of gaseous inclusions having a diameter greater than 50 microns was 0.005 defects per pound and the number having a diameter less than 50 microns was 0.018 defects per pound. Moreover, the glass was essentially completely free of zirconia-containing solid defects, the numbers of detectable $ZrO_2$ defects >50 microns, $ZrO_2$ defects <50 microns, and $ZrSiO_4$ defects >50 microns all being zero in the inspected glass (381 pounds).

The data of the above table is also relevant to $Q_R$-values. As shown in this table, the test system using molybdenum electrodes was able to run at 90 pounds/hour. Indeed, although higher rates were not tested, from the data collected at 90 pounds/hour, it was evident that the furnace could have been run at substantially higher pull rates. As set forth above in Eq. (3), a furnace's $Q_R$-value is equal to its horizontal cross-sectional area (i.e., its footprint in a manufacturing setting) divided by the rate at which molten glass is produced by the furnace in tons of glass per day. A pull-rate of 90 pounds/hour corresponds to 2,160 pounds/day or 1.08 tons/day. Using the $A_{furnace}$ value for the test furnace set forth above, i.e., 672 inches$^2$ (4.67 feet$^2$), gives a $Q_R$-value of 4.3 square feet/ton/day.

As also shown in the above table, the control system using tin oxide electrodes was able to run at 60 pounds/hour. Importantly, because of its use of tin oxide electrodes, the 60 pounds/hour pull rate represented an upper limit for the system. A pull rate of 90 pounds/hour was thus not achievable with the tin oxide system. Moreover, a $Q_R$-value as low as 4.3 square feet/ton/day was also not achievable with the tin oxide system, irrespective of the value of R. This can be seen by solving Eq. (3) for R given a $Q_R$-value of 4.3 and the above $A_{furnace}$ value for the tin oxide system, i.e., 498 inches$^2$ (3.46 feet$^2$). The value of R obtained in this way is 67 pounds/hour, which is above 60 pounds/hour and thus not achievable by the control system. As this calculation shows, tin oxide electrodes not only lead to higher levels of eluted zirconia, but they also limit the ability to obtain low $Q_R$-values.

Although not wishing to be bound by any theory of operation, it is believed that the limitations associated with tin oxide electrodes arise, at least in part, from the fact that when used to melt display quality glass, i.e., glasses having 200 poise temperatures equal to or above 1,550° C., the electrodes are supported within the side walls of the furnace. This location is believed to lead to the high wear rates shown in FIGS. 6-8 and thus the higher-than-desired levels of dissolved zirconia and solid zirconia-containing defects in glass sheets produced from furnaces employing tin oxide electrodes. In terms of flow rates and their associated $Q_R$-values, if one were to try to increase the flow rate and thus decrease $Q_R$ by increasing current flow through tin oxide electrodes, the zirconia wear problem would become even worse.

Moreover, in a commercial setting, the possibility of breakdown of the furnace's walls and surrounding insulation limits the amplitude (V) of the time-varying voltage applied to the electrodes. Specifically, for a given furnace width W, the placement of tin oxide electrodes in the side walls of the furnace results in relatively low current flows through the glass (i.e., to first order, for constant electrical properties, the current I varies as V/W), and thus relatively low amounts of electrical power transferred to the glass (i.e., to first order, for constant electrical properties, the power P varies as $V^2/W$). Hence, in addition to the zirconia wear problem, tin oxide electrodes are limited in their ability to produce high flow rates and low $Q_R$-values because of their location in the melting furnace when display quality glasses are to be melted.

In contrast, in embodiments of the furnaces disclosed herein, the molybdenum electrodes enter the molten glass through the bottom wall of the furnace and are spaced from the side walls. The spacing from the side walls minimizes erosion of those walls. As to erosion of the bottom wall of the furnace, molybdenum electrodes have their highest current densities near the top of the electrode, thus limiting the amount of damage caused to the bottom wall by the applied current.

Quantitatively, the use of molybdenum electrodes that are spaced from the furnaces side walls (either exclusively or, in some embodiments, in combination with molybdenum electrodes at other locations) allows display quality glass sheets to be produced at flow rates above 2,000 pounds/hour with $Q_R$-values that are substantially the same as or, in some embodiments, lower than those achieved with tin oxide electrodes for flow rates that do not exceed 2,000 pounds/hour. Moreover, the use of molybdenum electrodes allow flow rates above 2,000 pounds/hour to be achieved with the resulting glass sheets having a dissolved zirconia ($ZrO_2$) content on an oxide basis that is less than or equal to 0.1 weight percent, e.g., in some embodiments, less than or equal to 0.06 weight percent, in other embodiments, less than or equal to 0.05 weight percent, and, in still other embodiments, less than or equal to 0.04 weight percent. In addition to reducing erosion of the furnace's walls, having the electrodes inboard of the furnace's side walls also means that the spacing between the electrodes is smaller than the width of the furnace, thus allowing the power transferred to the glass to be enhanced compared to that which would be transferred if the electrodes were located at the side walls.

It should be noted that the '279 application discussed above has no appreciation of the value of molybdenum electrodes that project through the floor of a melting furnace so that current leaves the electrodes above the floor, as opposed to mounting the electrodes on or in the furnace's floor or the furnace's walls and injecting current at those locations. In particular, in its Application Examples, the '279 application uses electrodes, specifically, tin oxide electrodes, mounted on the floor and on the side walls. See the '279 application at paragraph [0074] ("multiple pairs of electrodes are arranged at the lower portion on both the left and right side walls and on the bottom wall").

Figure 11:
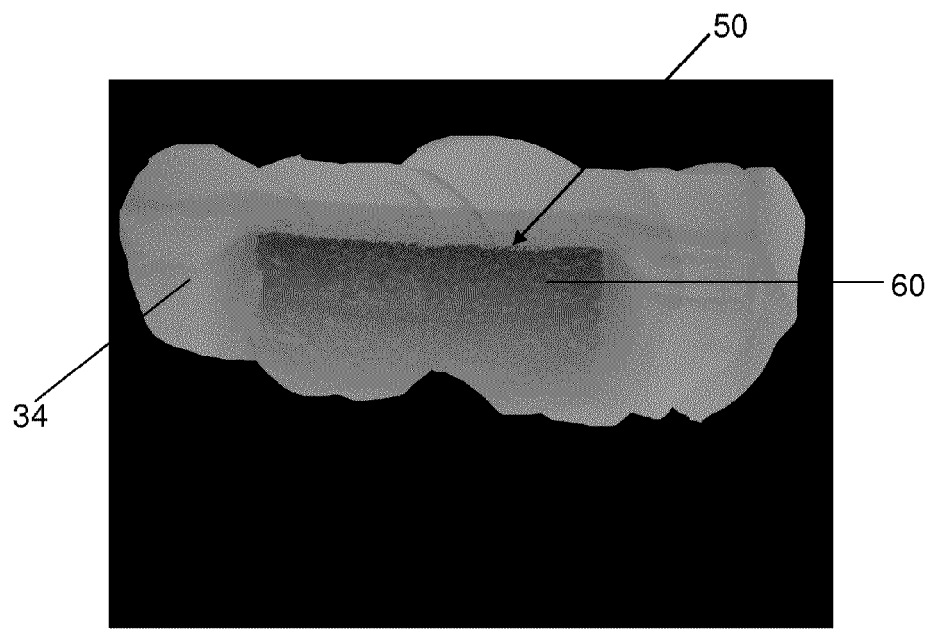
FIG. 11 is a photograph illustrating the formation of bubbles on the surface of a tin oxide electrode mounted in the wall of a melter.

A further advantage of molybdenum electrodes compared to tin oxide electrodes relates to the level of bubbles in the molten glass supplied to the finer portion of the glass manufacturing system. FIG. 11 is a photograph of the surface of a tin oxide electrode 50 during use. As can be seen in this figure, the surface of the electrode is covered with bubbles 60. These bubbles end up in the molten glass and need to be removed from the glass in the finer. Molybdenum electrodes, on the other hand, produce essentially no bubbles. Indeed, as discussed in more detail below, the elemental molybdenum which is introduced into the glass melt by the passage of current through molybdenum electrodes can serve a getter function that removes bubbles from the glass.

Figure 12:
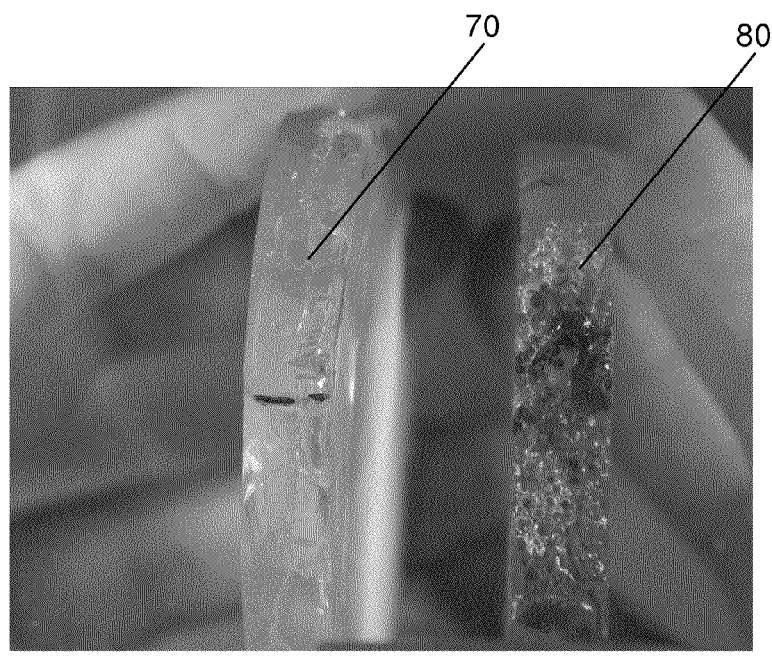
FIG. 12 is a photograph of two glass samples, one produced using a melter which employed molybdenum electrodes (sample 70) and the other produced using a melter that employed tin oxide electrodes (sample 80).

FIG. 12 illustrates the difference in bubble level between glass melted with molybdenum electrodes and glass melted with tin oxide electrodes. The two samples of glass shown in this figure were obtained by freezing glass in 1) the reduced-scale melter employing molybdenum electrodes (sample 70 in FIG. 12), and 2) the reduced-scale melter employing tin oxide electrodes (sample 80 in FIG. 12). As can be seen in these photographs, the tin oxide electrodes filled the glass with bubbles, while the molybdenum electrodes left it substantially clear. The bubble levels in the samples of FIG. 12 were quantified and it was found that the glass produced using tin oxide electrodes had a bubble (blister) level of 1070 bubbles/pound, while that produced using the molybdenum electrodes had a bubble level of 126 bubbles/pound, a reduction of 88%.

In addition to their ability to reduce elution of zirconia from furnace walls, in accordance with the present disclosure, it has been found that molybdenum electrodes are compatible with the agents used to fine "green" glasses. Specifically, molybdenum electrodes are compatible with tin oxide, the fining agent that is currently being used in place of arsenic, antimony, or both arsenic and antimony in the fining of environmentally-friendly (green) display quality glass sheets, such as, glass sheets composed of Corning Incorporated's EAGLE XG® glass. In an embodiment, when tin oxide is used as a fining agent, the average tin oxide concentration in the glass sheets in weight percent on an oxide basis will satisfy the relationship: $0.1 \leq [SnO_2] \leq 0.4$.

Historically, when tin oxide electrodes were used to electrically heat molten glass, a portion of the tin oxide used for fining was provided by the electrodes and a portion was added as a batch material. When molybdenum electrodes are used instead of tin oxide electrodes, all of the tin oxide is added as a batch material. In an embodiment, iron oxide can be used in combination with tin oxide for fining. In such an embodiment, the average iron oxide concentration in the glass sheets in weight percent on an oxide basis will satisfy the relationship: $0.015 \leq [Fe_2O_3] \leq 0.080$.

The compatibility of molybdenum electrodes with the use of tin oxide as a fining agent was unexpected because thermodynamically, elemental Mo reduces $SnO_2$ to SnO and may reduce SnO to Sn. Specifically, the oxygen equilibrium potential of molybdenum is well below that of tin oxide, so that from a thermodynamic point of view, molybdenum can strip oxygen from tin oxide. In order to perform its fining function, tin needs to be oxidized, and thus the presence of molybdenum electrodes in the melter should have compromised the ability to use tin oxide as a fining agent.

In practice, however, it was found that tin oxide retains its ability to fine display quality glass sheets notwithstanding the use of molybdenum electrodes to melt the batch materials. For example, the gaseous inclusion levels set forth above for molybdenum electrodes and a pull rate of 90 pounds/hour, i.e., 0.005 defects per pound for gaseous inclusions >50 microns and 0.018 defects per pound for gaseous inclusions <50 microns, were obtained using tin oxide as the fining agent. Although not wishing to be bound by any particular theory of operation, it is believed that high flow rates play an important role in the ability of tin oxide to continue to function as a fining agent in the presence of molybdenum electrodes even though thermodynamically it should be inactivated. Specifically, it is believed that the kinetics of the $Mo/SnO_2$ reaction are sufficiently slow so that enough tin oxide remains in an oxidized state to provide fining action in the finer if the flow rate through the melter is high enough. Quantitatively, in a commercial setting, a flow rate greater than 2,000 pounds/hour allows the thermodynamics problem to be overcome by reaction kinetics.

Beyond being compatible with tin oxide as a fining agent, molybdenum electrodes can actually contribute to the fining of display quality glass sheets by performing a "getter" function that removes oxygen-containing gaseous inclusions from the glass melt. This function arises because when in an electrode, molybdenum is a metallic element, while when in molten glass at high temperature, molybdenum acquires oxygen and becomes $MoO_2$ and $MoO_3$. Indeed, as discussed above, from a thermodynamic point of view, the transition from metallic Mo to oxidized Mo can involve stripping of oxygen from tin oxide if the flow rate through the melter is too low.

Irrespective of the source of the oxygen which reacts with molybdenum, the introduction of molybdenum metal into molten glass means that there is less oxygen available to form gaseous defects. The reduction in the number of gaseous defects as a result of this gettering activity is substantial. An order of magnitude calculation of the reduction in gaseous defects can be obtained as follows. First, the number of moles of gas in a gaseous defect can be estimated using the ideal gas law. For example, for a temperature of 1600° C., a pressure of 1 atmosphere, and an average defect diameter of 50 microns (i.e., an average defect volume of $\sim 6.5 \times 10^{-11}$ liters), the number of moles of gas per defect according to the ideal gas law is $\sim 4.3 \times 10^{-13}$ moles. Assuming the gas in the defects is oxygen, $\sim 2.9 \times 10^{-13}$ moles of Mo are needed to consume each defect. For a pull rate of 70 pounds/hour, a $MoO_3$ concentration of 5 ppm in the finished glass corresponds to a loss of elemental molybdenum from the electrodes of $\sim 1.1 \times 10^{-3}$ moles/hour. This, in turn, corresponds to a reduction of $\sim 3.9 \times 10^9$ gaseous defects/hour, a substantial number.

In addition to their beneficial effects, molybdenum electrodes have been found to have only a minimal effect on the transmission properties (including color) of display quality glass sheets, including sheets that contain tin and/or iron. Because of its ability to enter into redox reactions with tin and iron, the introduction of Mo into the glass could be expected to change the glass' color. Transmission data was therefore obtained for EAGLE XG® glass, which contained tin and iron, with varying amounts of added $MoO_3$.

Figure 13:
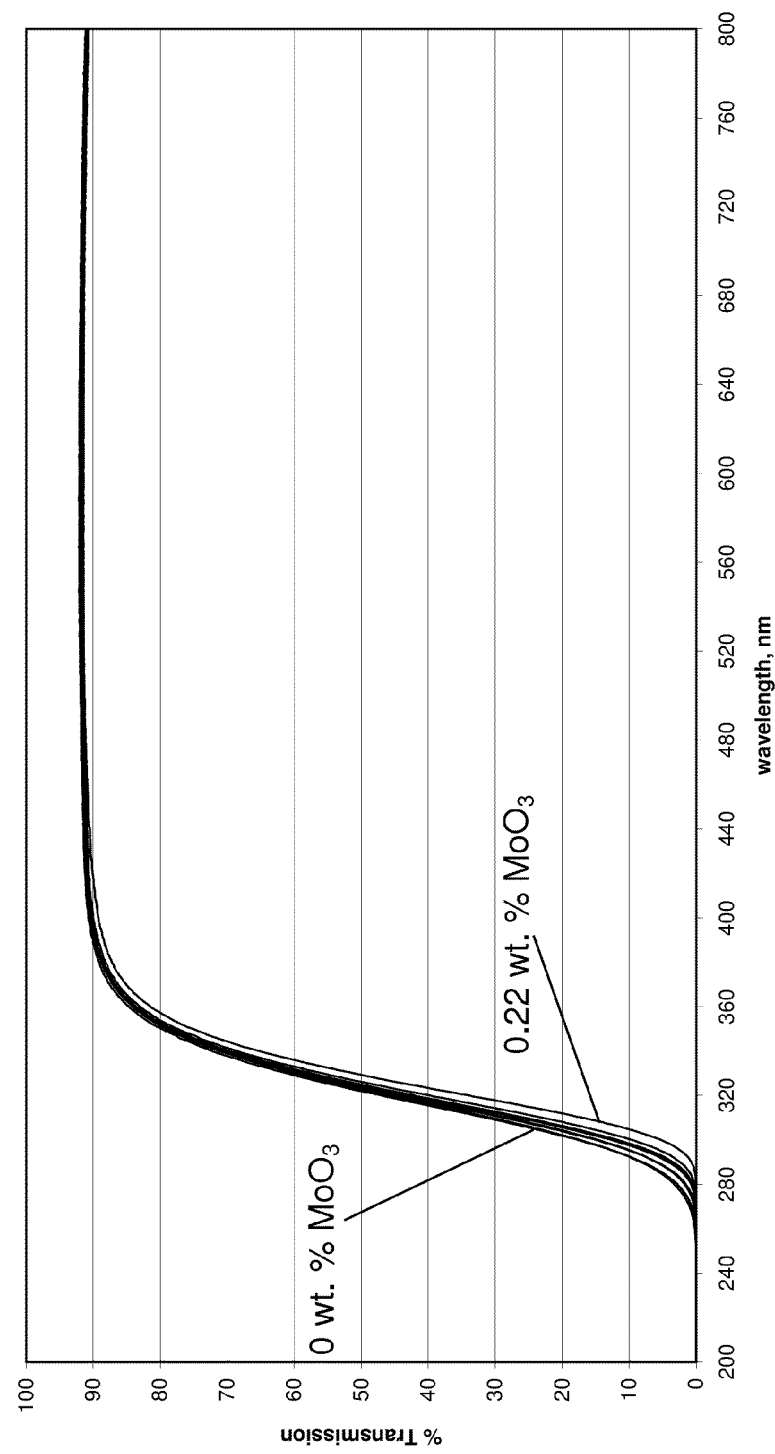
FIG. 13 is a graph showing light transmission through display quality glass samples for various $MoO_3$ concentrations ranging from 0 weight percent up to 0.22 weight percent.
Figure 14:
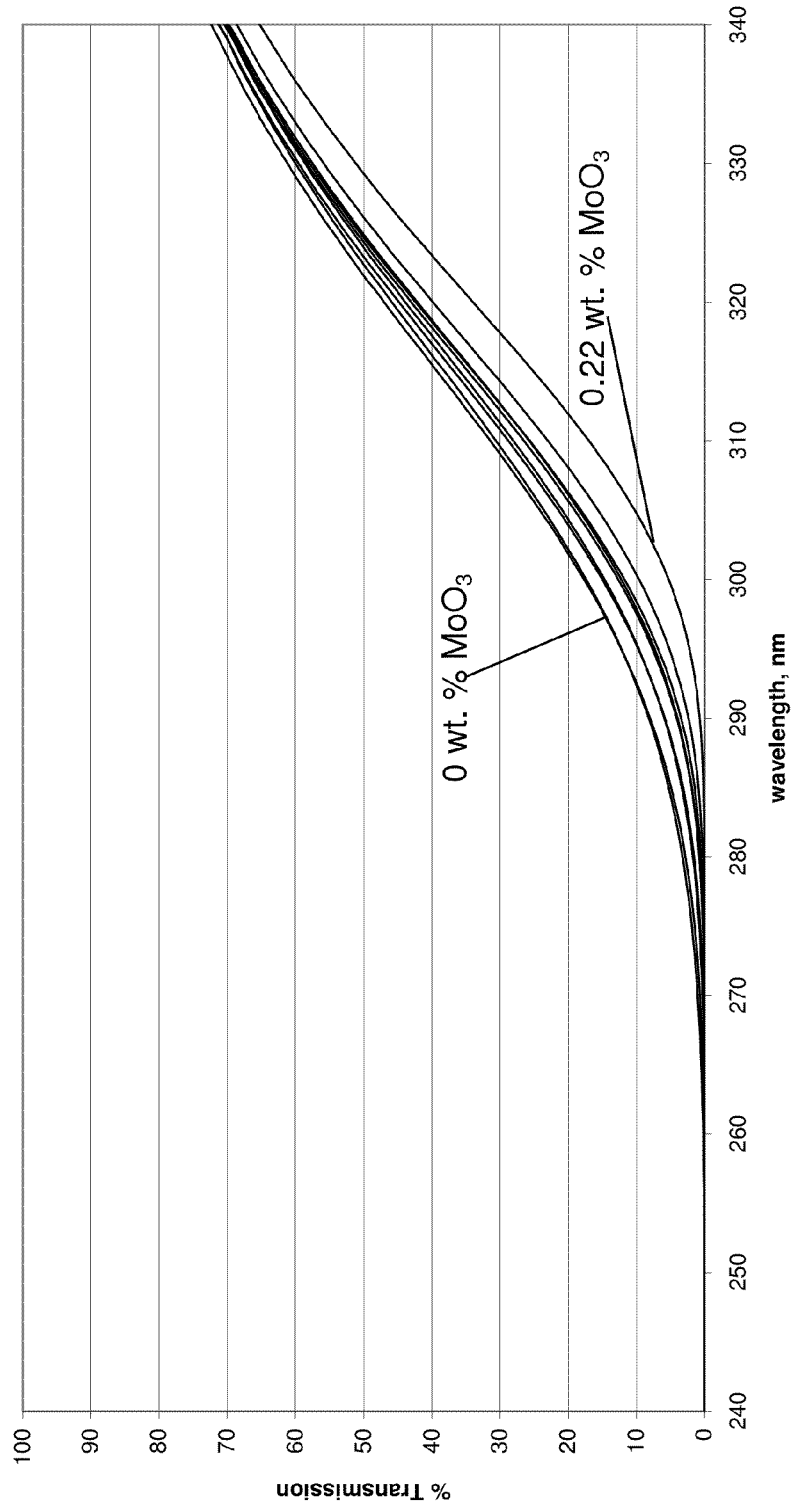
FIG. 14 is a graph showing the portion of FIG. 13 between 240 nanometers and 340 nanometers.

The results are shown in FIG. 13 for a wavelength range between 200 and 800 nanometers. In this figure (and FIG. 14), the uppermost curve is for 0 wt. % $MoO_3$, the lowermost curve is for 0.22 wt. % $MoO_3$, and the intermediate curves are for $MoO_3$ concentrations of 0.014, 0.028, 0.4, 0.075, 0.097, 0.10, and 0.12 wt. % in the glass. FIG. 14 shows the wavelength range of 240-340 nanometers in more detail.

As can be seen in these figures, although there is some added absorption at the UV end of the spectrum, over the visible range, the transmission spectrum of the glass is substantially unchanged by the presence of $MoO_3$ in the glass, even at the high levels used in this experiment. In particular, as can be seen from these figures, for the levels of $MoO_3$ introduced into glass sheets through the use of molybdenum electrodes, i.e., $MoO_3$ concentrations of less than 0.002 weight percent, the transmission of the sheets will be above 90% and will vary by less than 1% for wavelengths between 390 and 750 nanometers, i.e., over the visible range.

The display quality glass sheets produced using the melting furnaces disclosed herein can be composed of glasses having a variety of compositions, now known or subsequently developed. In general terms, the glasses will contain $SiO_2$ and $Al_2O_3$, and, depending on the application, at least two of: $B_2O_3$, MgO, CaO, SrO, BaO, $Na_2O$, $K_2O$, and $Li_2O$. The glasses will generally be "hard" glasses having 200 poise temperatures of at least 1550° C., e.g., at least 1600° C. Accordingly, to convert the batch materials for the glasses into molten glass requires a high temperature melting furnace, with the molten glass leaving the furnace having a temperature above 1450° C., e.g., an exit temperature of, for example, ~1600° C.

As non-limiting examples, the sheets can be used as substrates for liquid crystal and other types of displays and can have compositions of the types disclosed in Dumbaugh, Jr. et al., U.S. Pat. No. 5,374,595; Chacon et al., U.S. Pat. No. 6,319,867; Ellison, U.S. Pat. No. 7,534,734; Danielson et al., U.S. Pat. No. 7,833,919; Ellison, U.S. Pat. No. 7,851,394; Moffatt et al., U.S. Reissue No. RE37,920; and Kohli, U.S. Reissue No. RE41,127; the contents of which are incorporated herein by reference in their entireties. As further non-limiting examples, the sheets can be used in the manufacture of faceplates and/or touch surfaces for electronic devices and can have compositions of the types disclosed in Dejneka et al., U.S. Pat. No. 8,158,543; Dejneka et al., U.S. Patent Application Publication No. 2011/0045961; and Barefoot et al., U.S. Patent Application Publication No. 2011/0201490; the contents of which are incorporated herein by reference in their entireties. The above compositions for display glasses and faceplate/touch screen glasses can also be used in photovoltaic devices, as well as other devices in which light transmission is of importance, e.g., sensor applications. In addition to the compositions disclosed in the above patents and patent applications, the furnaces disclosed herein can also be used in the melting of glasses of the types disclosed in the references cited in those documents and/or during their prosecution.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

What is claimed is:

1. A method for making display quality glass sheets comprising:
   (I) melting batch materials in a furnace to produce molten glass;
   (II) fining the melted batch materials in a finer;
   (III) forming a glass ribbon from the fined, molten glass; and
   (IV) separating glass sheets from the ribbon;
   wherein:
   (a) the furnace has an internal surface, a portion of which contacts molten glass;
   (b) said portion of the internal surface that contacts molten glass comprises $ZrO_2$ as its major constituent;
   (c) the melting of step (I) comprises employing a plurality of electrodes to pass electrical current through the molten glass;
   (d) each of the plurality of electrodes comprises molybdenum as its major constituent;
   (e) molten glass leaves the furnace and enters the finer at a rate R, where at steady state, R satisfies the relationship:

$R \geq 2,000$ pounds/hour; and (f) at steady state, the glass sheets produced in step (IV) are characterized by:
   (i) the glass making up the glass sheets is an alumina-silicate glass;
   (ii) the average content of $ZrO_2$ in the glass sheets satisfies the relationship:

$[ZrO_2] \leq 0.1$, where $[ZrO_2]$ is in weight percent on an oxide basis;
   (iii) the average content of $MoO_3$ in the glass sheets satisfies the relationship:

$0 < [MoO_3] \leq 0.002$, where $[MoO_3]$ is in weight percent on an oxide basis; and
   (iv) prior to removal of any unacceptable glass sheets, a population of 50 sequential sheets has an average level of solid defects plus gaseous defects of a size greater than 100 microns that is less than or equal to 0.012 defects per pound of glass, where each of the glass sheets has a thickness that is less than or equal to 2.0 millimeters and a weight of at least 10 pounds.

2. The method of claim 1 wherein:
   (i) the melting of step (I) produces a volume of molten glass in the furnace that has a horizontal cross-sectional area $A_{furnace}$;
   (ii) at steady state, the sheets are separated from the ribbon in step (IV) at a rate such that the quotient $Q_R$ obtained by dividing $A_{furnace}$ in square feet by R in tons of glass/day satisfies the relationship:

$Q_R \leq 7$

3. The method of claim 2 wherein:
   (ii) at steady state, the sheets are separated from the ribbon in step (IV) at a rate such that the quotient $Q_R$ obtained by dividing $A_{furnace}$ in square feet by R in tons of glass/day satisfies the relationship:

$Q_R \leq 7$.

4. The method of claim 1 where:
   (i) the furnace used in step (I) comprises a bottom wall and side walls; and
   (ii) the plurality of electrodes pass through the bottom wall and are spaced from the side walls.

5. The method of claim 1 wherein during step (I):
   (i) each of the plurality of electrodes has a first portion that is submerged in molten glass and a second portion that is not submerged; and
   (ii) the second portion of each electrode is surrounded by an inert gas.

6. The method of claim 5 wherein the inert gas is nitrogen.

7. The method of claim 5 wherein the inert gas is treated to remove oxygen.

8. The method of claim 1 wherein:
   (i) after step (I) and prior to step (IV), the molten glass contacts an internal surface of a wall of a vessel where the wall comprises platinum or a platinum alloy; and
   (ii) the method further comprises inhibiting the formation of gaseous inclusions in the molten glass as a result of outward hydrogen permeation through the wall.

9. The method of claim 8 wherein:
   (i) the wall has an external surface opposite to the internal surface which is contacted by the molten glass; and
   (ii) the inhibiting comprises exposing the external surface to an atmosphere having a composition which produces a hydrogen concentration at the external surface that reduces outward hydrogen permeation through the wall.

10. The method of claim 1 wherein:
    (i) the melting of the batch materials in step (I) employs a power input P; and
    (ii) at least 30 percent of P is provided by the plurality of electrodes.

11. The method of claim 1 wherein the molten glass leaving the furnace has a temperature above 1450° C.

12. The method of claim 1 wherein the transmission of the glass sheets is above 90% and varies by less than 1% for wavelengths between 390 and 750 nanometers.

13. The method of claim 1 wherein the fining of step (II) is performed without the use of arsenic or antimony as a batch material.

14. The method of claim 13 wherein the batch materials of step (I) include tin oxide as a batch component, the tin oxide serving as a fining agent in step (II).

15. The method of claim 14 wherein the average content of $SnO_2$ in the glass sheets produced in step (IV) satisfies the relationship:

$0.1 \leq [SnO_2] \leq 0.4$, where $[SnO_2]$ is in weight percent on an oxide basis.

16. The method of claim 14 wherein the batch materials of step (I) include iron oxide as a batch component, the iron oxide serving as a fining agent in step (II).

17. The method of claim 16 wherein the average content of $Fe_2O_3$ in the glass sheets produced in step (IV) satisfies the relationship:

$0.015 \leq [Fe_2O_3] \leq 0.080$, where $[Fe_2O_3]$ is in weight percent on an oxide basis.

18. The method of claim 1 further comprising using the display quality glass sheets as substrates in the manufacture of displays.

19. The method of claim 1 further comprising using the display quality glass sheets in the manufacture of faceplates or touch surfaces for electronic devices.

20. The method of claim 1 further comprising using the display quality glass sheets in the manufacture of photovoltaic devices.

* * * * *